United States Patent
Di Anna

(10) Patent No.: US 7,409,743 B2
(45) Date of Patent: Aug. 12, 2008

(54) APPARATUS FOR CLEANING AIR DISCHARGE FROM AGRICULTURAL HARVESTER

(76) Inventor: Guiseppe Di Anna, 5912 Garst Rd., Modesto, CA (US) 95357

( * ) Notice: Subject to any disclaimer, the term of this patent is extended or adjusted under 35 U.S.C. 154(b) by 543 days.

(21) Appl. No.: 11/228,858

(22) Filed: Sep. 16, 2005

(65) Prior Publication Data

US 2007/0066369 A1     Mar. 22, 2007

(51) Int. Cl.
  *A47L 5/00*   (2006.01)
  *E01H 1/08*   (2006.01)
(52) U.S. Cl. .................. 15/340.1; 15/347; 55/385.1
(58) Field of Classification Search ............... 15/340.1, 15/340.3, 340.4, 347, 346, 348; 55/385.1, 55/399, 396; 460/99, 79; 56/13.3, 16.5, 56/203, 328.1
See application file for complete search history.

(56) References Cited

U.S. PATENT DOCUMENTS

| | | | | |
|---|---|---|---|---|
| 394,240 A * | 12/1888 | Allington et al. | ............... | 55/394 |
| 1,959,736 A * | 5/1934 | Rademacher | ............... | 209/697 |
| 2,719,057 A * | 9/1955 | Gamper | ............... | 406/105 |
| 2,721,656 A * | 10/1955 | Goodwin | ............... | 209/36 |
| 3,176,737 A * | 4/1965 | Shaw | ............... | 99/570 |
| 3,406,424 A * | 10/1968 | Rush | ............... | 15/340.3 |
| 3,475,889 A * | 11/1969 | Overstreet et al. | ......... | 56/328.1 |
| 3,745,752 A * | 7/1973 | Gallaer | ............... | 55/418 |
| 3,910,508 A * | 10/1975 | Stauffer et al. | ......... | 241/101.75 |
| 3,953,184 A * | 4/1976 | Stockford et al. | ............. | 55/458 |
| 4,344,538 A * | 8/1982 | Fujisawa et al. | ............ | 209/719 |
| 4,364,222 A | 12/1982 | Ramacher | | |
| 4,624,691 A * | 11/1986 | Schneider | ............... | 55/396 |
| 4,642,977 A * | 2/1987 | Ramacher | ............... | 56/328.1 |
| 5,421,147 A | 6/1995 | Holden et al. | | |
| 5,778,648 A * | 7/1998 | Parkes et al. | ............... | 56/202 |
| 6,036,600 A | 3/2000 | Kruckman | | |
| 6,574,828 B2 * | 6/2003 | Hile | ............... | 15/340.4 |
| 6,658,833 B2 * | 12/2003 | Dunning et al. | ............... | 56/202 |
| 6,904,742 B2 * | 6/2005 | Dunning et al. | ............... | 56/202 |
| 7,020,930 B2 * | 4/2006 | Hile | ............... | 15/340.4 |
| 2005/0229576 A1 * | 10/2005 | Flora et al. | ............... | 56/328.1 |

* cited by examiner

*Primary Examiner*—Árpád Fábián-Kovács
(74) *Attorney, Agent, or Firm*—R. Michael West

(57) ABSTRACT

An apparatus for cleaning the air discharged from an agricultural harvester. A separation housing has inlet and outlet ends. The inlet end includes an upper chute, a lower chute, and a separation wall therebetween. The lower chute extends from the inlet end to a clean air discharge intermediate the inlet and outlet ends. Air entering the lower chute is relatively clean, and is discharged to the atmosphere through the clean air discharge. Air entering the upper chute is relatively dirty, and is routed through the upper chute to a separation chamber having an upper input end, a lower output end, and a downwardly inclined passageway extending therebetween. Small particles and dust precipitate from the air and collect on the floor of the passageway. Harvester movement urges the particles and dust to exit from the output end dropping onto the ground, and clean air exits directly therefrom into the atmosphere.

22 Claims, 2 Drawing Sheets

APPARATUS FOR CLEANING AIR DISCHARGE FROM AGRICULTURAL HARVESTER

BACKGROUND OF THE INVENTION

1. Field of the Invention

The invention relates generally to devices for segregating and removing airborne dust and debris created during the crop harvesting process. More particularly, the invention pertains to a two-stage air/dust separator which processes and cleans the dirty air outputted by the suction fan used to separate crop from debris in an agricultural harvester.

2. Description of the Prior Art

Prior art harvesting machines typically employ a combination of gravitational and pneumatic forces to separate crop from commingled debris, mechanically collected from the ground during the harvesting process. This separation process generates a considerable amount of dust, debris, and airborne pollutants. U.S. Pat. No. 4,364,222, granted to Ramacher, shows a Nut Harvesting Machine employing the combination of a foraminous conveyor belt and a centrifugal suction fan. As shown in FIG. 1 of the '222 Patent, the discharge from the centrifugal fan, containing dust and debris which has been separated from the nut crop, is simply laterally discharged from the harvester into the air. The airborne pollutants may drift or be carried by wind currents to locations miles away from the orchard being harvested, causing health and environmental problems for the general public.

U.S. Pat. No. 5,421,147, issued to Holden et al., teaches a Nut Harvester including a scoop section within the lower portion of the centrifugal fan housing. The scoop section collects dirt and heavier debris passing through the fan housing and deposits them directly on the ground. The '147 Patent claims that through this partitioning action, dust emissions and airborne pollutants created during the harvesting process are minimized.

In another example of prior art efforts to control harvester air pollution, U.S. Pat. No. 6,036,600, granted to Kruckman, shows a Combine Dust Eliminator. An elongated dust eliminator housing has a pair of dust discharge chutes at either end. Fans are included to draw the contaminated air into the housing and drive it out a respective one of the discharge chutes. A "dust curtain" is provided at each discharge chute, to impede airborne dust outflow.

From the foregoing, it is apparent that the prior art recognizes the need to reduce harvester-caused air pollution. However, the devices known to Applicant either do not process the discharge sufficiently, or they require a relatively complex system of fans and large duct work to operate.

Thus, the need exists for an apparatus for cleaning air discharged from an agricultural harvester which effectively processes the discharge, but does not rely upon actively driven fans or other moving structures.

The need also exists for an air cleaning apparatus which is readily coupled to the existing air discharge from an agricultural harvester, and which can be mounted onto the existing frame of the harvester without extensive modifications.

The need also exists for an air cleaning apparatus having a two stage dust and debris separator, the first stage relying upon the centrifugal forces created by a centrifugal fan to separate dirty air from clean air, and the second stage relying upon a combination of residence time in a downwardly-directed labyrinth and gravitational forces to segregate debris, dirt and fine dust particles from clean air outputted to the atmosphere.

These and other objects of the present invention will be described in the drawings and in the detailed description of the preferred embodiment set forth below.

SUMMARY OF THE INVENTION

The air cleaning apparatus of the present invention includes an elongated separation housing having an inlet end and an outlet end. This separation housing is the first stage of the air cleaning apparatus. The inlet end of the separation housing includes an upper chute, a lower chute, and a separation wall between the two chutes. The upper chute and the separation wall extend the entire length of the housing, from the inlet end to the outlet end. The lower chute is considerably shorter, extending from the inlet end to a clean air discharge which is intermediate the inlet end and the outlet end.

The second stage of the air cleaning apparatus comprises a separation chamber, having an upper input end, a lower output end, and a downwardly inclined passageway or labyrinth extending between the input end and the output end. The passageway or labyrinth is preferably configured as a helical screw, owing to its compact nature. However, other configurations may be used with similar results. For example, a plurality of elongated tubes or ducts may be stacked in vertically declining relation, with alternating ends serial connected to effect a continuous downward transport of settling debris. The input end of the separation chamber is interconnected to the outlet end of the housing, and the output end is preferably adjacent the ground, at the after end of the harvester.

Air entering the inlet end of the upper chute has a higher concentration of dirt and solids than air entering the inlet end of the lower chute, owing to the centrifugal forces imposed by the centrifugal fan acting on the discharged air. The separation wall effectively prevents commingling of the dirty air passing through the upper chute to the output end with the clean air passing through the lower chute to the clean air discharge.

The dirty air routed by the upper chute to the upper end of the separation chamber, is slowed down in velocity as a consequence of flow resistance as the air passes through the labyrinth. Small particles of dust collect and aggregate as they fall on the downwardly inclined floor of the labyrinth. A combination of gravitational forces and the mechanical jostling of the harvester while it is underway urges the dust particles downwardly toward the output end of the separation chamber, where they drop onto the ground. The remaining air, cleansed of debris, dirt and dust particles, exits at a relatively low velocity, from the output end directly into the atmosphere.

DETAILED DESCRIPTION OF THE PREFERRED EMBODIMENT

Figure 1:
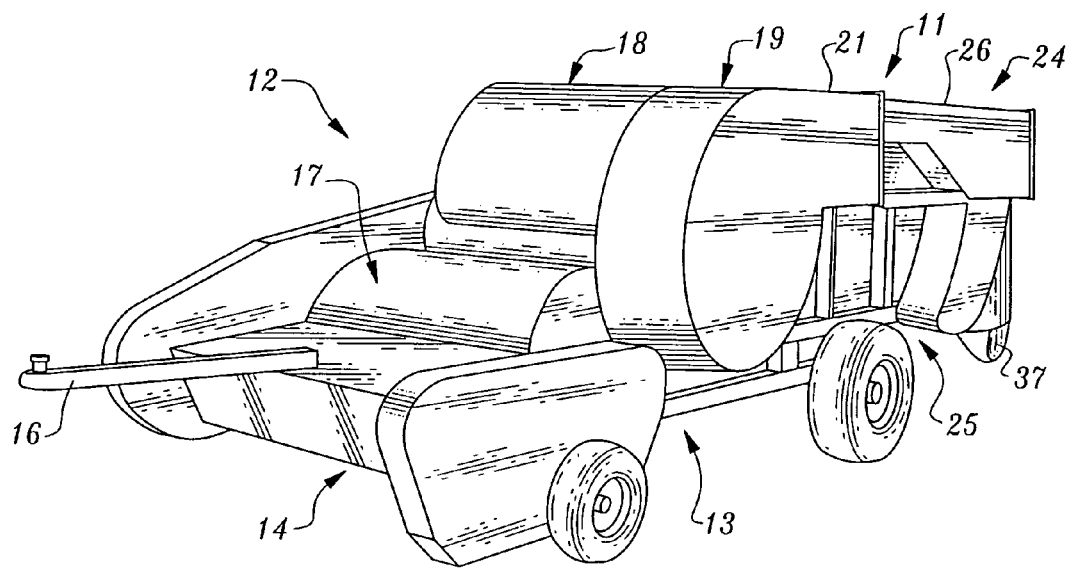
FIG. 1 is a left front perspective view of a crop harvester, fitted with the apparatus of the present invention, for cleaning air discharged from the harvester.

The air cleaning apparatus 11 of the present invention is typically used in combination with an agricultural harvester 12. Harvester 12 may be specially designed to collect any crop and segregate it from plant and ground debris picked up during the harvesting operation. By way of example only, harvester 12 may harvest crops such as almonds, walnuts, hazelnuts, pecans, pistachios, and grapes. Harvester 12 is mounted upon a mobile frame 13, adapted to support and transport the harvester 12 as it passes through rows of an orchard, vineyard, or field. Mobile frame 13 has a forward end 14 to which a tractor tow bar 16 may be attached. Alternatively, harvester 12 may be entirely self-propelled with one or more operators controlling and overseeing the harvesting operations.

Housing 17 contains crop pickup and separator systems, which are well known in the art and need not be disclosed in further detail herein. Housing 17 is located adjacent the forward end 14 of the frame, where the crop is first encountered by the forward movement of the harvester 12. Immediately behind housing 17 is an air plenum 18, typically overlying a foraminous crop conveyor (not shown). Vacuum forces generated by a suction fan 19 uplift debris, dirt and dust and remove them from the crop as it is passed rearwardly by the conveyor. Crop harvesters commonly use a suction fan 19 of centrifugal design, as centrifugal fans are relatively simple to construct and maintain. In addition, centrifugal fans can pass large amounts of debris without clogging.

The apparatus 11 of the present invention uses a characteristic of centrifugal fans to advantage, in performing the first stage of the cleaning process. Suction fan 19 has a dirty air discharge 21 including therein a flow of relatively dirty air 22 stratified from a flow of relatively clean air 23. This stratification results from the centrifugal forces imposed on the heavier debris, dirt and dust, which tend to be propelled against the wall region of the fan's housing.

Immediately downstream from dirty air discharge 21 is an elongated separation housing 24, conveniently mounted on mobile frame 13. Since the air cleaning apparatus 11 has no moving parts and requires no mechanical drive or electrical power, it is readily adaptable for fitting onto an existing harvester as a retrofit modification. Of course, the apparatus 11 may also be integrated into the frame and support structure of a new harvester construction just as easily.

Figure 2:
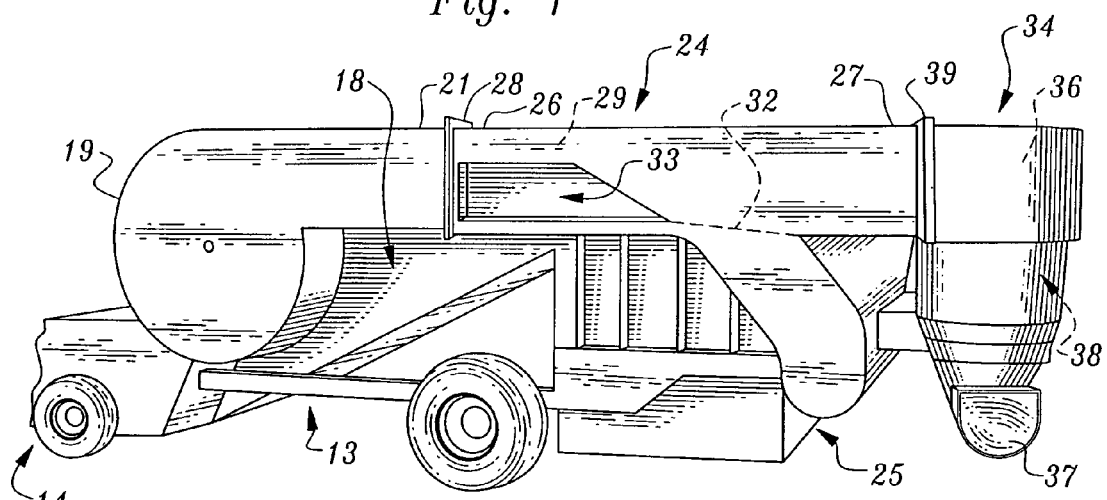
FIG. 2 is a perspective view of the side and rear end portions of the harvester, showing the elongated separation housing extending between the output of the centrifugal fan and the separation chamber.
Figure 3:
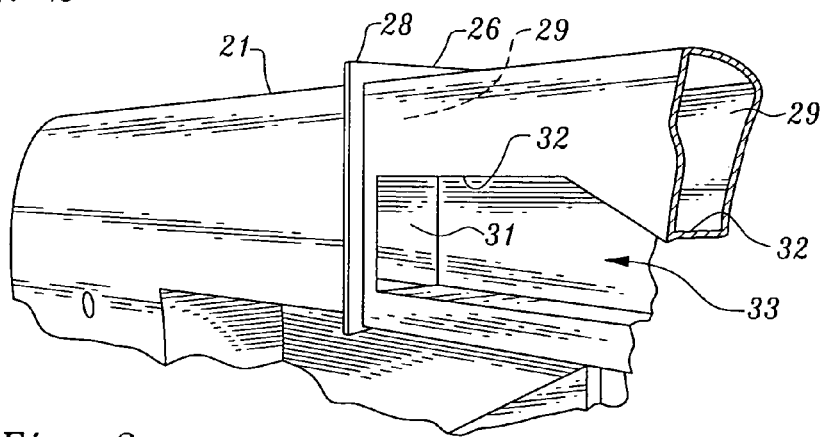
FIG. 3 is a close-up perspective view of the inlet end of the upper chute and the lower chute of the separation housing, showing a portion of the clean air discharge.

Housing 24 has an inlet end 26 and a outlet end 27, as shown in FIG. 2. Since housing 24 is relatively long, it is convenient to locate inlet end 26 adjacent forward end 14 of frame 13, and outlet end 27 adjacent a rearward end 25 of frame 13. Inlet end 26 is interconnected to dirty air discharge 21 through a peripheral flange 28. Inlet end 26 further includes an upper chute 29, a lower chute 31, and a separation wall 32 therebetween. Upper chute 29 and separation wall 32 extend within housing 24 from inlet end 26 to outlet end 27. Lower chute 31 extends from inlet end 26 to a clean air discharge 33 which is intermediate inlet end 26 and outlet end 27. Separation housing 24 thereby comprises the first stage of air cleaning apparatus 11.

Figures 4, 5:
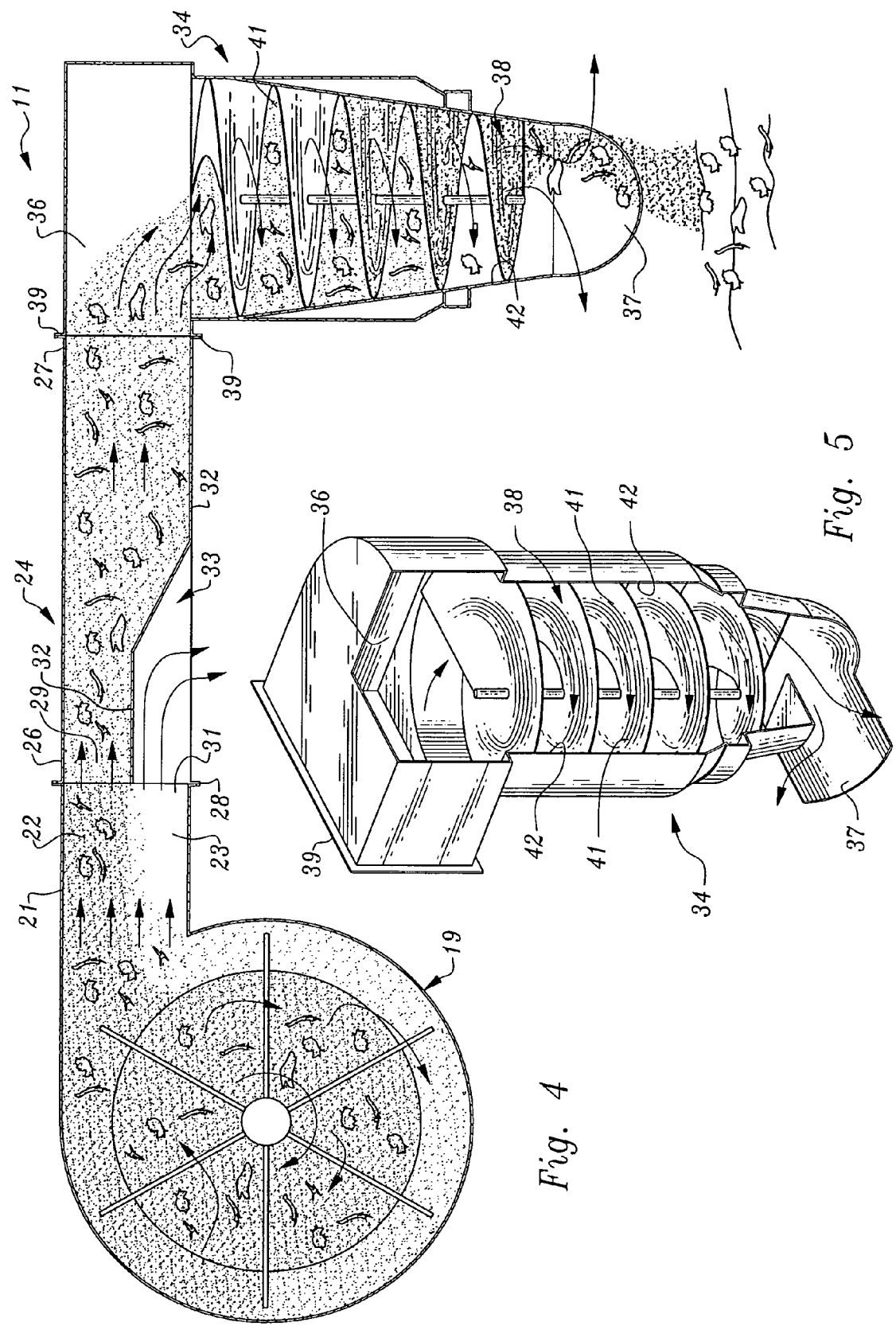
FIG. 4 is a longitudinal, cross-sectional view of the centrifugal fan, the separation housing, and the separation chamber, showing the processing of dirty air as it passes through the air cleaning apparatus; and, FIG. 5 is a perspective view of the separation chamber, with a portion of the sidewall broken away to show the progression of air through the helical labyrinth of the chamber.

The second stage of air cleaning apparatus 11 comprises a separation chamber 34, mounted adjacent the rearward end 25 of frame 13. Separation chamber 34 has an upper input end 36, a lower output end 37, and a downwardly inclined passageway 38. As is shown most clearly in FIGS. 4 and 5, passageway 38 extends between upper input end 36 and lower output end 37. Input end 36 of separation chamber 34 is interconnected to outlet end 27 of housing 24 by means of peripheral flange 39. Output end 37 is preferably adjacent the ground, to facilitate the direct deposit of dirt and debris thereon.

Passageway 38 as disclosed herein resembles a helical screw, having a vertically oriented axis. As shown, passageway 38 further includes a floor 41 which is outwardly confined by sidewalls 42, right-circular cylindrical in configuration. This construction provides a compact yet effective means for second stage cleaning of dirty air. It is evident, however, that other passageway or labyrinth arrangements could be used in lieu of the helical screw, and provide similar results. If there were ample room, a plurality of elongated tubes or ducts could be stacked in vertically declining relation, with alternating ends serial-connected to effect a continuous downward transport of settling dust, dirt, and debris.

Several design parameters for alternative construction of the passageway 38 should be considered. The passageway must be continuously declining and must be sufficiently long to allow settling of dust, dirt and debris from the dirty air. This occurs both through the forces of gravity and through slowing the rate of passage of air through the passageway. In effect, the passageway 38 provides sufficient air flow resistance, or back pressure, to the output of fan 19, that the air flow rate through passageway 38 is relatively slow. This allows the unwanted particles to fall out of suspension from the dirty air, and collect on the floor 41.

In operation of the air cleaning apparatus 11, air entering the upper chute 29 of inlet end 26 is relatively dirty, having a higher concentration of dirt and debris than the relatively clean air, entering lower chute 31 of inlet end 26. Separation wall 32 prevents commingling of the relatively dirty air passing through upper chute 29, and the relatively clean air passing through lower chute 31. The air passing through lower chute 31 is sufficiently clean for direct exhaust, and is passed into the atmosphere through clean air discharge 33.

The relatively dirty air is passes through upper chute 29, into the upper input end 36 of separation chamber 34. Passageway 38 provides a degree of air flow resistance, slowing down the speed of the incoming dirty air. Dust and dirt particles and debris fall out of air suspension, onto floor 41 where they collect. Owing to the shaking and jostling of chamber 34 as the harvester proceeds through harvesting, the dirt and debris particles are urged under force of gravity down the inclined floor 41 toward the output end 37 of the separation chamber 34. There, the dirt and debris drop onto the ground, and clean air exits at a relatively low velocity from the output end 37 directly into the atmosphere.

What is claimed is:

1. An apparatus for cleaning the air discharged from an agricultural harvester, comprising:
   a. an elongated separation housing having an inlet end and a outlet end, said inlet end including an upper chute, a lower chute, and a separation wall therebetween, said upper chute and said separation wall extending within said housing from said inlet end to said outlet end, and said lower chute extending from said inlet end to a clean air discharge intermediate said inlet end and said outlet end; and,
   b. a separation chamber, said separation chamber having an upper input end, a lower output end, and a downwardly inclined passageway extending between said input end and said output end, said input end being interconnected to said outlet end of said housing, whereby air entering said upper chute of said inlet end is dirty, having a higher concentration of dirt and debris than air entering said lower chute of said inlet end and said separation wall prevents commingling of air passing through said upper and lower chutes.

2. An apparatus as in claim 1 in which said separation chamber is subjected to shaking and jostling, whereby dirty air routed by said upper chute to said upper input end of said separation chamber is slowed down in velocity through resistive forces imposed on the air passing through said passageway causing small particles of dirt and debris to fall on a downwardly inclined floor of said passageway, the shaking and jostling urging the dirt and debris particles toward the output end of said separation chamber to drop onto the ground and clean air exits at a relatively low velocity from said output end into the atmosphere.

3. An apparatus as in claim 2 in which said apparatus is mounted on a mechanical harvester and in which movement of said harvester during the harvesting process provides the shaking and jostling of said separation chamber.

4. An apparatus as in claim 1 in which centrifugal forces cause air entering said upper chute of said inlet end to have a higher concentration of dirt and debris than air entering said lower chute of said inlet end.

5. An apparatus as in claim 4 in which air entering said lower chute is discharged directly into the atmosphere through said clean air discharge.

6. An apparatus as in claim 4 in which said centrifugal forces are imparted to air entering said upper chute and said lower chute by a centrifugal fan.

7. An apparatus as in claim 1 in which said separation chamber is right-circular cylindrical in configuration, having a vertically oriented axis, and in which said downwardly inclined passageway is defined by a helical screw within said separation chamber, said helical screw having an axis which is coincident with said axis of said separation chamber, whereby dirt particles and debris settle on and migrate downwardly on an upper surface of said helical screw, as air passes downwardly from said input end to said output end.

8. An apparatus as in claim 1 in which said apparatus is mounted on the frame of an agricultural harvester, and in which said inlet end of said separation housing is adjacent a forward end of the frame and in which said outlet end of said separation chamber is adjacent a rearward end of the frame.

9. An apparatus for cleaning the air discharged from an agricultural harvester, comprising:
  a. first stage separator means for segregating dirty air from clean air, said first stage separator means having an inlet end and a outlet end, said inlet end including an upper chute, a lower chute, and a separation wall therebetween, said upper chute and said separation wall extending within said separator means from said inlet end to said outlet end, and said lower chute extending from said inlet end to a clean air discharge intermediate said inlet end and said outlet end; and,
  b. second stage separator means for settling out dirt and debris from dirty air, said second stage separator means including an upper input end, a lower output end, and a downwardly inclined passageway extending between said input end and said output end, said input end being interconnected to said outlet end of said housing, whereby air entering said upper chute of said inlet end of said first stage separator mean is dirty, having a higher concentration of dirt and debris than air entering said lower chute of said inlet end and said separation wall prevents commingling of air passing through said upper and lower chutes, and clean air is discharged into the atmosphere through said clean air discharge.

10. An apparatus as in claim 9 in which said second stage separation means is subjected to shaking and jostling, whereby dirty air routed by said upper chute to said upper input end of said second stage separation means is slowed down in velocity through resistive forces imposed on the air passing through said passageway causing small particles of dirt and debris to fall on a downwardly inclined floor of the passageway, the shaking and jostling urging the dirt and debris particles toward the output end of said second stage separation means to drop onto the ground and clean air exits at a relatively low velocity from said output end into the atmosphere.

11. An apparatus as in claim 10 in which said apparatus is mounted on a mechanical harvester and in which movement of said harvester during the harvesting process provides the shaking and jostling of said second stage separation means.

12. An apparatus as in claim 9 in which centrifugal forces cause air entering said upper chute of said inlet end to have a higher concentration of dirt and debris than air entering said lower chute of said inlet end.

13. An apparatus as in claim 12 in which air entering said lower chute is discharged directly into the atmosphere through said clean air discharge.

14. An apparatus as in claim 12 in which said centrifugal forces are imparted to air entering said upper chute and said lower chute by a centrifugal fan.

15. An apparatus as in claim 9 in which said second stage separation means is right-circular cylindrical in configuration, having a vertically oriented axis, and in which said downwardly inclined passageway is defined by a helical screw, whereby dirt particles and debris settle on and migrate downwardly on an upper surface of said helical screw, as air passes downwardly from said input end to said output end.

16. An apparatus as in claim 9 in which said apparatus is mounted on the frame of an agricultural harvester, and in which said inlet end of said separation housing is adjacent a forward end of the frame and in which said outlet end of said separation chamber is adjacent a rearward end of the frame.

17. An agricultural harvester comprising:
  a. a mobile frame;
  b. a suction fan on said frame, said suction fan having a dirty air discharge;
  c. an elongated separation housing on said frame having an inlet end and a outlet end, said inlet end being interconnected to said dirty air discharge of said suction fan, said inlet end further including an upper chute, a lower chute, and a separation wall therebetween, said upper chute and said separation wall extending within said housing from said inlet end to said outlet end, and said lower chute extending from said inlet end to a clean air discharge intermediate said inlet end and said outlet end; and,
  d. a separation chamber, said separation chamber having an upper input end, a lower output end, and a downwardly inclined passageway extending between said input end and said output end, said input end being interconnected to said outlet end of said housing, whereby air entering said upper chute of said inlet end is dirty, having a higher concentration of dirt and debris than air entering said lower chute of said inlet end and said separation wall prevents commingling of air passing through said upper and lower chutes.

18. An apparatus as in claim 17 in which said separation chamber is subjected to shaking and jostling through movement of said mobile frame during harvesting, whereby dirty air routed by said upper chute to said upper input end of said separation chamber is slowed down in velocity through resistive forces imposed on the air passing through said passageway causing small particles of dirt and debris to fall on a downwardly inclined floor of said passageway, the shaking and jostling urging the dirt and debris particles toward the output end of said separation chamber to drop onto the ground and clean air exits at a relatively low velocity from said output end into the atmosphere.

19. An apparatus as in claim 17 in which centrifugal forces cause air entering said upper chute of said inlet end to have a higher concentration of dirt and debris than air entering said lower chute of said inlet end.

20. An apparatus as in claim 19 in which said centrifugal forces are imparted to air entering said upper chute and said lower chute by a centrifugal fan.

21. An apparatus as in claim 17 in which said separation chamber is right-circular cylindrical in configuration, having a vertically oriented axis, and in which said downwardly inclined passageway is defined by a helical screw within said separation chamber, said helical screw having an axis which is coincident with said axis of said separation chamber, whereby dirt particles and debris settle on and migrate downwardly on an upper surface of said helical screw, as air passes downwardly from said input end to said output end.

22. An apparatus as in claim 17 in which said inlet end of said separation housing is adjacent a forward end of said mobile frame and in which said outlet end of said separation chamber is adjacent a rearward end of said mobile frame.

\* \* \* \* \*